(12) United States Patent
Zhao et al.

(10) Patent No.: US 12,527,560 B2
(45) Date of Patent: Jan. 20, 2026

(54) OCCLUDER AND OCCLUSION SYSTEM

(71) Applicant: HANGZHOU DINOVA EP TECHNOLOGY CO., LTD, Zhejiang (CN)

(72) Inventors: Jianglang Zhao, Hangzhou (CN); Xiaoyang Cheng, Hangzhou (CN); Jie Chen, Hangzhou (CN); Yongsheng Wang, Hangzhou (CN)

(73) Assignee: Hangzhou Dinova EP Technology Co., Ltd., Hangzhou (CN)

( * ) Notice: Subject to any disclaimer, the term of this patent is extended or adjusted under 35 U.S.C. 154(b) by 455 days.

(21) Appl. No.: 18/090,335

(22) Filed: Dec. 28, 2022

(65) Prior Publication Data

US 2023/0139430 A1 May 4, 2023

Related U.S. Application Data

(63) Continuation of application No. PCT/CN2021/103311, filed on Jun. 29, 2021.

(30) Foreign Application Priority Data

Jul. 1, 2020 (CN) .......................... 202010625562.0
Jul. 1, 2020 (CN) .......................... 202021260172.X

(51) Int. Cl.
*A61B 17/00* (2006.01)

(52) U.S. Cl.
CPC ...... *A61B 17/0057* (2013.01); *A61B 2017/00606* (2013.01); *A61B 2017/00663* (2013.01)

(58) Field of Classification Search
CPC ........ A61B 2017/00663; A61B 2017/00619; A61B 2017/00606; A61B 2017/00597; A61B 2017/00575
See application file for complete search history.

(56) References Cited

U.S. PATENT DOCUMENTS 4,917,089 A * 4/1990 Sideris ............... A61B 17/0057 606/153
5,171,259 A * 12/1992 Inoue ................. A61B 17/0057 606/232

(Continued)

FOREIGN PATENT DOCUMENTS

| CN | 201831930 U | 5/2011 |
| CN | 103284772 A | 9/2013 |
| CN | 106473791 A | 3/2017 |

OTHER PUBLICATIONS

Extended European Search Report Dated Jun. 24, 2024 for Corresponding European Application No. 21833659.2.

(Continued)

*Primary Examiner* — Alexander J Orkin

(57) ABSTRACT

The present application provides an occluder, for use in occluding a defect in a vascular system. The occluder comprises a first occlusion disc, a second occlusion disc, and a tightening wire; the first occlusion disc and the second occlusion disc are used for covering different openings of a defect, respectively; a connector is provided on the first occlusion disc; the connector is provided with a wire passing hole; the tightening wire passes through the wire passing hole of the connector; two ends of the tightening wire pass through the second occlusion disc, and form an adjustment wire knot on the side of the second occlusion disc facing away from the first occlusion disc; the distance between the first occlusion disc and the second occlusion disc can be adjusted by the ends of the tightening wire. The present application also provides an occlusion system having the occluder.

17 Claims, 13 Drawing Sheets

(56) References Cited

U.S. PATENT DOCUMENTS

| | | | | |
|---|---|---|---|---|
| 5,433,727 | A * | 7/1995 | Sideris | A61B 17/0057 606/213 |
| 5,879,366 | A * | 3/1999 | Shaw | A61B 17/0057 606/151 |
| 6,214,029 | B1 * | 4/2001 | Thill | A61B 17/0057 606/213 |
| 8,777,983 | B2 * | 7/2014 | Kato | A61B 17/1285 606/213 |
| 2001/0027347 | A1 * | 10/2001 | Rousseau | A61B 17/0057 623/23.72 |
| 2002/0183787 | A1 * | 12/2002 | Wahr | A61B 18/1492 606/213 |
| 2002/0198562 | A1 * | 12/2002 | Akerfeldt | A61B 17/0057 606/213 |
| 2004/0002763 | A1 * | 1/2004 | Phillips | A61B 17/0401 623/17.16 |
| 2004/0073242 | A1 * | 4/2004 | Chanduszko | A61B 17/12172 606/157 |
| 2005/0273135 | A1 | 12/2005 | Chanduszko et al. | |
| 2006/0069408 | A1 * | 3/2006 | Kato | A61B 17/0057 606/213 |
| 2006/0135991 | A1 * | 6/2006 | Kawaura | A61B 17/0057 606/213 |
| 2007/0179527 | A1 | 8/2007 | Eskuri et al. | |
| 2008/0091235 | A1 * | 4/2008 | Sirota | A61B 17/0057 606/215 |
| 2009/0082804 | A1 * | 3/2009 | Kato | A61B 17/1227 606/213 |
| 2010/0191295 | A1 * | 7/2010 | Trieu | A61B 17/0057 606/228 |
| 2010/0234878 | A1 * | 9/2010 | Hruska | A61B 17/0057 606/213 |
| 2011/0270278 | A1 * | 11/2011 | Overes | A61B 17/0487 606/228 |
| 2014/0031862 | A1 | 1/2014 | Chanduszko | |
| 2014/0142610 | A1 * | 5/2014 | Larsen | A61B 17/12122 606/200 |
| 2014/0336672 | A1 * | 11/2014 | Walters | A61B 17/0057 606/139 |
| 2016/0074023 | A1 * | 3/2016 | Sakamoto | A61B 17/0057 606/200 |
| 2016/0135813 | A1 * | 5/2016 | Johnson | A61B 17/12022 606/213 |
| 2022/0346803 | A1 * | 11/2022 | Wang | A61B 17/0057 |

OTHER PUBLICATIONS

International Search Report dated Sep. 28, 2021 for corresponding PCT Application No. PCT/CN2021/103311.

Written Opinion of the International Search Authority in corresponding International application No. PCT/CN2021/103311.

* cited by examiner

OCCLUDER AND OCCLUSION SYSTEM

CROSS-REFERENCE TO RELATED APPLICATIONS

The present application is a Continuation application of PCT Application No. PCT/CN2021/103311, filed on Jun. 29, 2021, which claims the priority of Chinese Patent Application No. 202010625562.0, filed on Jul. 1, 2020, and Chinese Patent Application No. 202021260172.X, filed on Jul. 1, 2020, the entire contents of which are hereby incorporated by reference.

TECHNICAL FIELD

The present application relates to the field of medical devices, in particular to an occluder for occluding human body defects, and an occlusion system provided with the occluder. The occluder can occlude an oval foramen, and can also be used to occlude patent ductus arteriosus, and atrial septal and ventricular septal defects.

DESCRIPTION OF THE PRIOR ART

Oval foramen is usually closed in the first year after birth. If the oval foramen is not closed in children over 3 years, it is called Patent Oval Foramen (PFO). The oval foramens in 20%~25% of the adults are not closed completely. Patent oval foramen (PFO) is a malformation in which the primary and secondary diaphragms at the oval fossa are not completely fused, with a permanent fissure-like defect therebetween, resulting in horizontal atrial shunt. Patent oval foramen is associated with a variety of clinical conditions, including paradoxical systemic embolism, such as ischemic stroke, transient ischemic attack, myocardial infarction, peripheral vascular embolism, decompression sickness, hypoxemia and aura migraine and so on.

In recent year, because of the advancement of cardiac catheterization technology and the improvement of occluder material, interventional occlusion has become the first clinical choice instead of thoracotomy for patent oval foramen with indication. In the prior art, the patent oval foramen occluder generally includes two disks and a cylindrical slender waist connected between the two disks. The cylindrical slender waist presses the primary septum and the secondary septum to be deformed, and the two disks clamp and fix the deformed defect to block blood flow.

However, the length of the cylindrical slender waist of the occluder for the patent oval foramen in the prior art cannot be adjusted. Therefore, the exiting occluder is only suitable for treatment of the patent oval foramen with the overlapping length of the primary septum and the secondary septum within a certain range. In the case of a patent oval foramen with a longer or shorter overlapping length, the occlusion effect is not ideal, a large residual shunt can be easily generated between the primary diaphragm and the secondary diaphragm after treatment, and the blood flow rate would be changed when the blood flows through the oval foramen, with a risk of thrombosis. For this reason, patients need to prolong the time of anticoagulant therapy, and if the resulted thrombus enters the blood circulation, it can cause serious adverse events such as embolism.

SUMMARY OF THE DISCLOSURE

The present application provides an occluder for occluding a defect in a vasculature, the occluder comprising: a first occluding disk and a second occluding disk for respectively covering different openings of the defect, wherein the first occluding disk is provided with a connecting member, and the connecting member is provided with a threading hole, and a tightening wire passing through the threading hole of the connecting member, two ends of the tightening wire passing through the second occluding disk and forming an adjusting knot on a side of the second occluding disk facing away from the first occluding disk, and a spacing between the first occluding disk and the second occluding disk being adjustable by the ends of the tightening wire.

The present application further provides an occlusion system comprising an occluder comprising a first occluding disk, a second occluding disk and a tightening wire. The first occluding disk and the second occluding disk are respectively used to cover different openings of a defect. The first occluding disk is provided with a connecting member, and the connecting member is provided with a threading hole. The tightening wire passes through the threading hole of the connecting member, two ends of the tightening wire pass through the second occluding disk and form an adjusting knot on a side of the second occluding disk facing away from the first occluding disk, and a spacing between the first occluding disk and the second occluding disk is adjustable by the ends of the tightening wire. The delivery device is used to connect the tightening wire and for controlling the ends of the tightening wire to adjust the spacing between the first and second occluding disks.

In the occlusion system provided by the present application, two occluding disks are used to respectively cover different openings of the defect, two ends of the tightening wire pass through the second occluding disk and form an adjusting knot at a side of the second occluding disk facing away from the first occluding disk, wherein the distance between the first occluding disk and the second occluding disk can be adjusted by the ends of the tightening wire, in order to occlude different types of defects, which is beneficial to improving the closeness between the two occluding disks and the peripheral tissues of the defect, thereby stably occluding the defect. That is, after the occluder is implanted, the defect is less deformed, without affecting the endothelialization on the occluding disk, reducing the generation of residual shunt, avoiding the requirements for customized occluders due to specific defects of individual patients, expanding the applications of the occluder so that more patients can benefit from the minimally invasive surgery.

In addition, the tightening wire passes through the threading hole of the connecting member to connect the first occluding disk, so that the tightening wire can freely slide through the threading hole in the process of adjusting the tightening wire to change the length of the tightening wire between the two occluding disks, thereby changing the distance between the two occluding disks. In contrast to the case where the tightening wire is directly connected to the first occluding disk without passing through the threading hole of the connecting member, the connection position of the tightening wire with the first occluding disk cannot be easily changed, and in the process of adjusting the distance between the two occluding disks, the tightening wire can slide smoothly through the threading hole. In addition, in the case where the first occluding disk is covered with a film such as a flow-blocking film, as the tightening wire passes through the threading hole of the connecting member to connect the first occluding disk, eyelets in the film on the first occluding disk for connecting the tightening wire can be avoided, maintaining the wholeness of the film, and reducing the generation of residual shunt and film breakage after the occluder is implanted into the human body.

BRIEF DESCRIPTION OF DRAWINGS

In order to more clearly illustrate the technical solutions of the embodiments of the present application, the drawings for the embodiment are briefly described below. It is apparent that the drawings in the following description are some embodiments of the present application, for those skilled in the art, other drawings can be obtained from the drawings without creative labor.

DESCRIPTION OF EMBODIMENTS

The technical solutions according to the embodiments of the present application will be clearly and fully described below with reference to the drawings according to the embodiments of the present application. Apparently, the described embodiments are only part of the embodiments of the present application, but not all embodiments. Based on the embodiments of the present application, other embodiments obtained by the skilled person in the art without any creative labor fall within the protection scope of the present application.

In the description of the present application, the "proximal end" refers to the end close to the control from the operator and the "distal end" refers to the end away from the control from the operator. The axial direction refers to the direction along the central axis of the occluder, and the radial direction is the direction perpendicular to the central axis. These terms are only for convenience of description and should not be construed as limitations on the present application.

Figure 1:
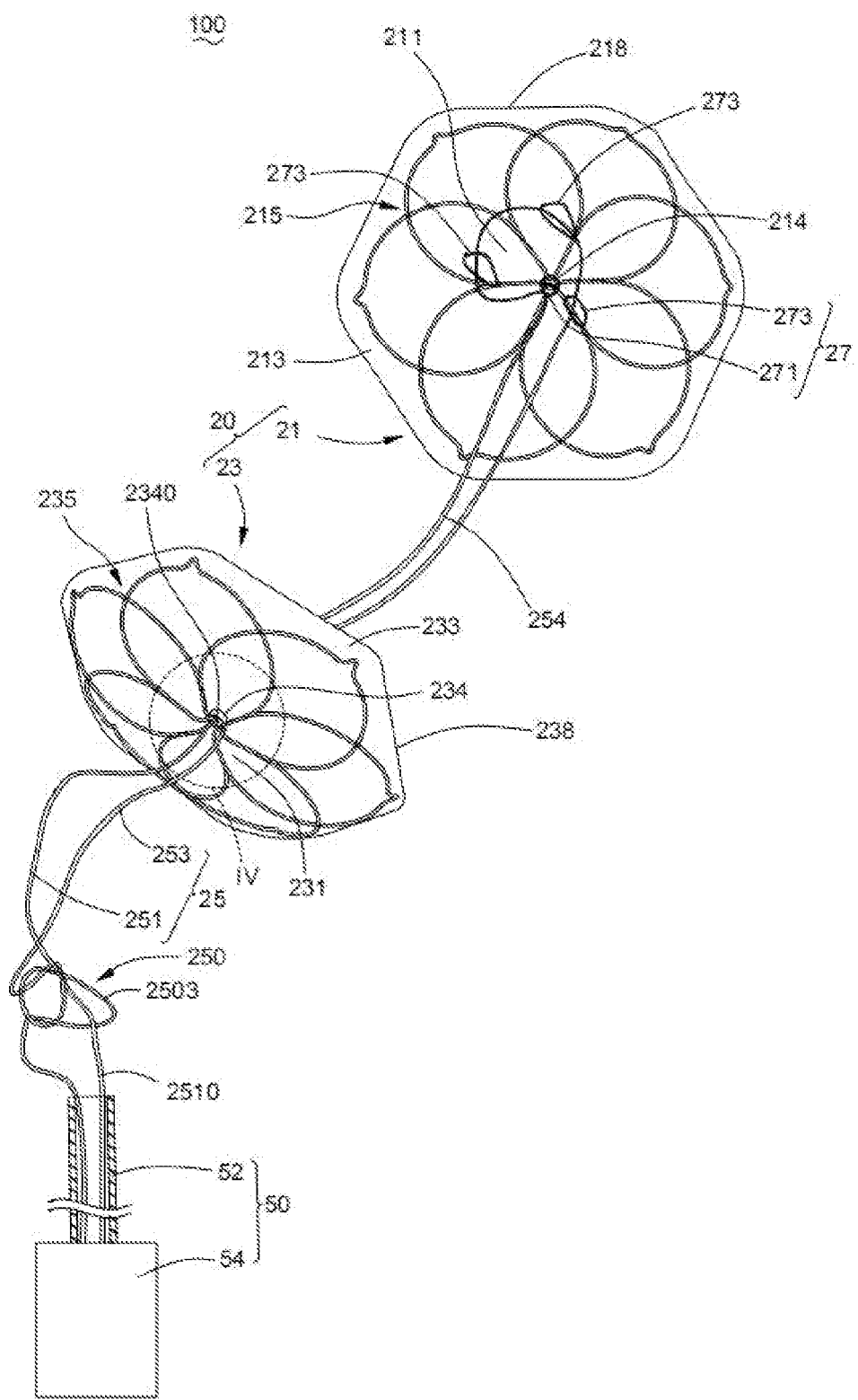
FIG. 1 is a schematic structural view of an occlusion system according to an embodiment of the present application.
Figure 2:
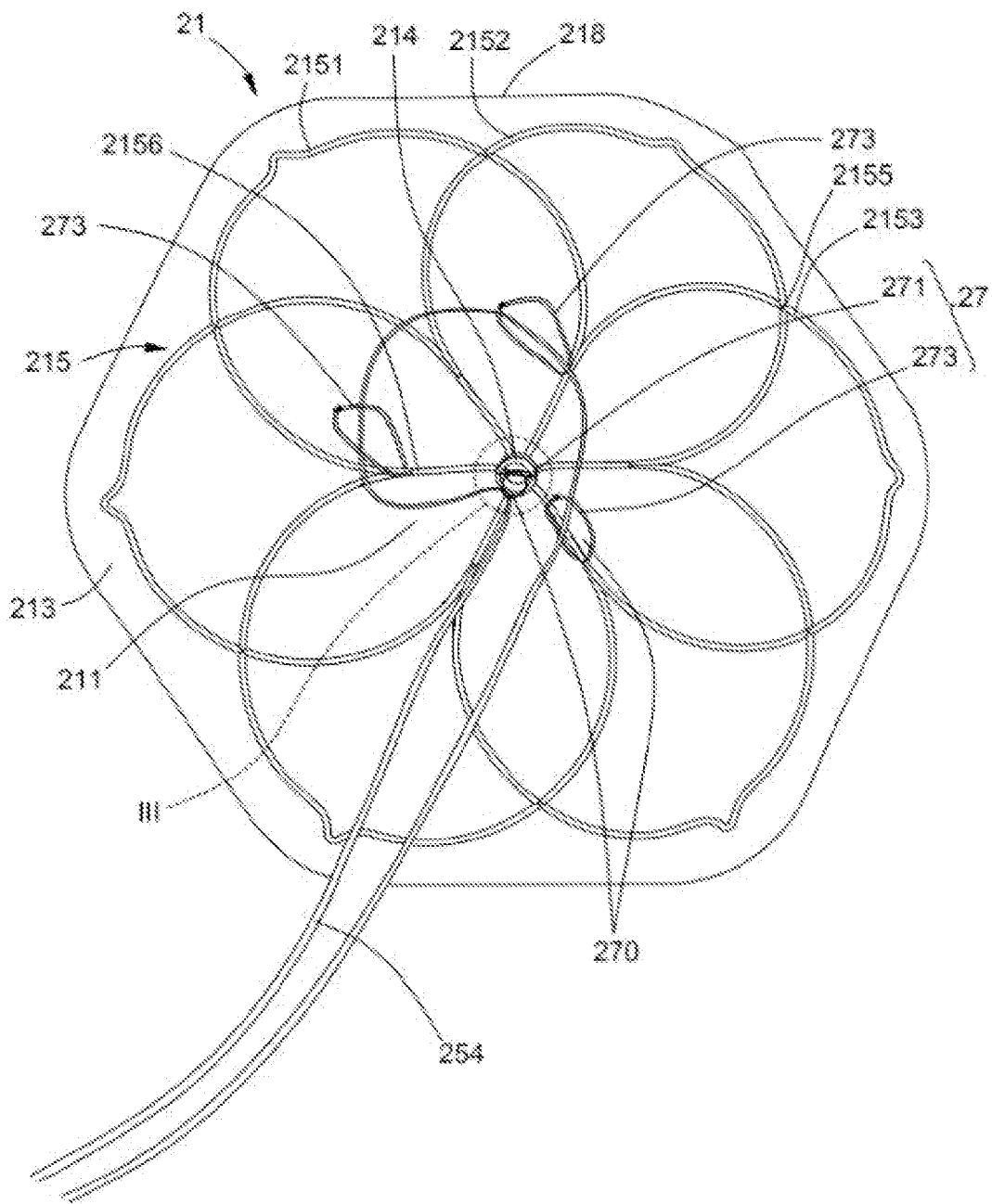
FIG. 2 is a schematic structural view of a first occluding disk of the occlusion system of FIG. 1.
Figure 3:
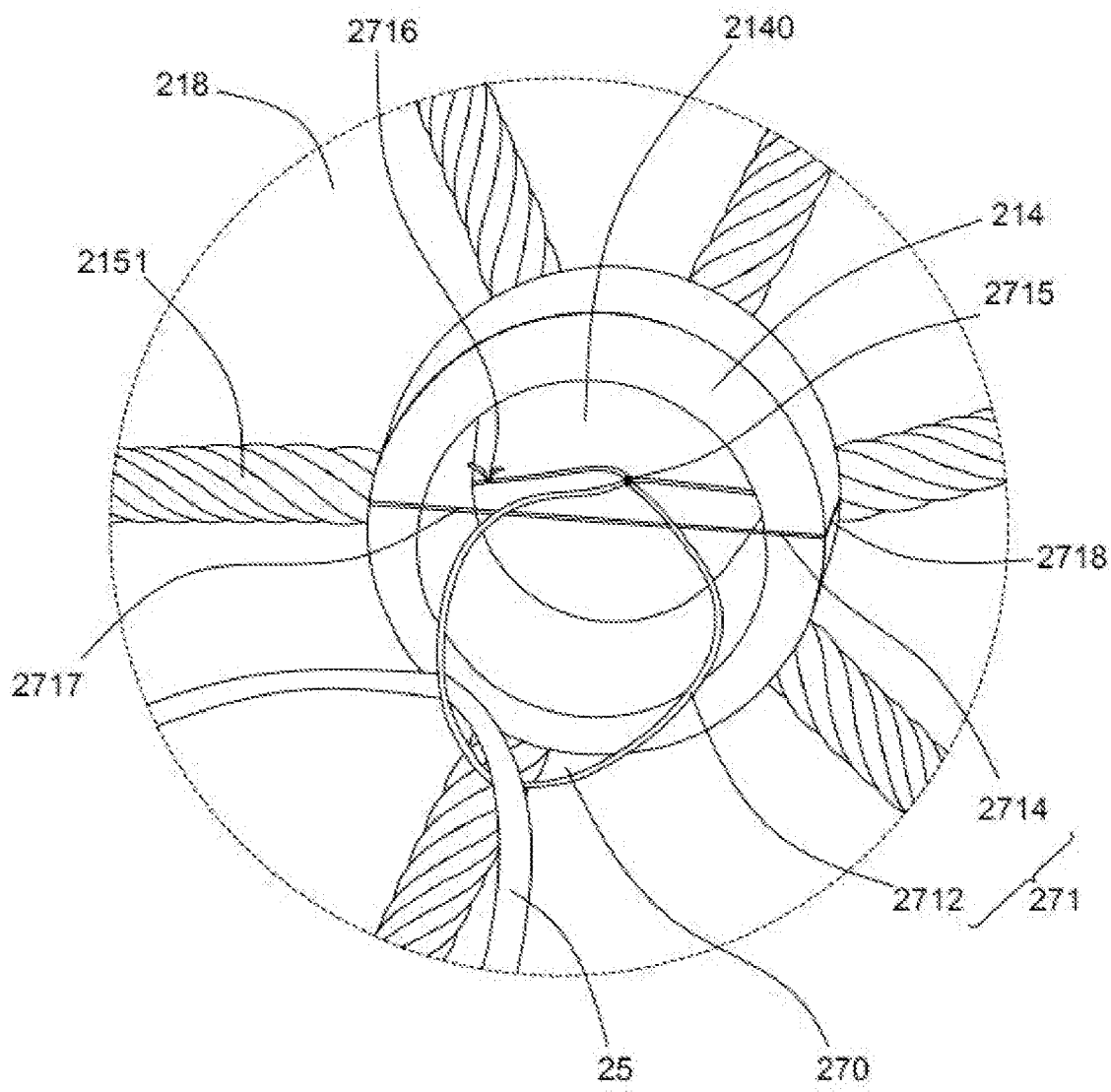
FIG. 3 is an enlarged view of part III of FIG. 2.

Referring to FIGS. 1 to 3, an occlusion system 100 is provided, which includes an occluder 20 for occluding a defect in a vasculature and a delivery device 50 for releasing the occluder 20. The defect includes, but not limited to, an oval foramen, a ductus arteriosus, an atrial septal defect, a ventricular septal defect, or the like. In the present application, the oval foramen is taken as an example of the defect for illustrating the advantages of the occlusion system 100 for treating a patent oval foramen. It can be understood that the defect can be other defects mentioned above.

The occluder 20 includes a first occluding disk 21, a second occluding disk 23, and a tightening member. The first occluding disk 21 and the second occluding disk 23 are respectively used to cover different openings of the defect in the vasculature. The first occluding disk 21 is provided with a connecting member 27 which has a threading hole 270. The tightening member is a tightening wire 25, which passes through the threading hole 270 of the connecting member 27. Two ends of the tightening wire 25 pass through the second occluding disk 23 and form an adjusting knot 250 on the side of the second occluding disk 23 facing away from the first occluding disk 21. The spacing between the first occluding disk 21 and the second occluding disk 23 can be adjusted through the ends of the tightening wire 25. The delivery device 50 includes a sheath 52 for receiving the occluder 20 and delivering the occluder 20 into the vasculature of the human body and a handle 54 connected to the proximal end of the sheath 52 for the operator to control the delivery and release of the occluder 20, and the distance between the first occluding disk 21 and the second occluding disk 23 can be adjusted by adjusting the tightening wire 25 in order to meet the requirements of different patients and different tissue anatomies.

After implantation of the occlusion system 100 of the present application, the first occluding disk 21 and the second occluding disk 23 respectively cover on two sides of the tissue, wherein the sides of the first occluding disk 21 and the second occluding disk 23 for clamping the tissue are the inner sides of the first occluding disk 21 and the second occluding disk 23, and the sides of the first occluding disk 21 and the second occluding disk 23 facing away from the clamped tissue are the outer sides. In this embodiment, the occluder is an oval foramen occluder. The peripheries of the openings on the opposite sides of the oval foramen, i.e., the areas on the two sides of the primary diaphragm and the secondary diaphragm adjacent to the oval foramen are covered by the first occluding disk 21 and the second occluding disk 23, respectively, wherein the sides of the first occluding disk 21 and the second occluding disk 23 covering the primary diaphragm and the secondary diaphragm are the inner sides, and the sides of the first occluding disk 21 and the second occluding disk 23 facing away from the primary diaphragm and the secondary diaphragm are the outer sides. The tightening wire 25 passes through the threading hole 270 of the connecting member 27, and two ends of the tightening wire 25 pass through the second occluding disk 23 and form the adjusting knot 250 on the outer side of the second occluding disk 23. The spacing between the first occluding disk 21 and the second occluding disk 23 can be controlled by adjusting the tightening wire 25 connected with the first occluding disk 21 and the second occluding disk 23, in order to occlude different types of defects and to adapt to the anatomy of the patient, improving the closeness between the first and second occluding disks 21 and 23 and the tissues around the oval foramen, thereby stably occluding the oval foramen. As the distance between the first occluding disk 21 and the second occluding disk 23 is adjustable after implantation of the occluder 20, the primary diaphragm and the secondary diaphragm are less deformed, without affecting the endothelialization of the primary diaphragm and the secondary diaphragm on the occluding disks, reducing the generation of residual shunt, avoiding the requirements for customized occluders due to specific oval foramens of individual patients, expanding the applications of the PFO occluder so that more patients can benefit from the minimally invasive surgery. Further, the tightening wire 25 passes through the threading hole 270 of the connecting member 27 to connect the first occluding disk 21 so that when adjusting the tightening wire 25, the tightening wire 25 can slide freely through the threading hole 270 to change the length of the tightening wire 25 between the two occluding disks, thereby changing the distance between the two occluding disks. In contrast to the case where the tightening wire 25 is directly connected to the first occluding disk 21 without passing through the threading hole 270 of the connecting member 27, the connection position of the tightening wire 25 with the first occluding disk 21 in the present application cannot be easily changed, and the tightening wire 25 can slide relatively smoothly through the threading hole 270 during the process of adjusting the distance between the two occluding disks. In addition, in the case where the first occluding disk 21 is covered with a film such as a flow-blocking film, as the tightening wire 25 passes through the threading hole of the connecting member 27 to connect the first occluding disk 21, eyelets in the film on the first occluding disk 21 for connecting the tightening wire can be reduced, maintaining the wholeness of the film, and reducing the generation of residual shunt and film breakage after the occluder is implanted into the human body.

As shown in FIG. 2 and FIG. 3, the first occluding disk 21 includes a central region 211 and an edge region 213 at the edge of the central region 211. The connecting member 27 includes a first coil 271 disposed at the center of the central region 211. The first coil 271 has an annular shape and is provided with the threading hole 270 through which the tightening wire 25 passes. When the tightening wire 25 is tensioned, the tightening wire 25 can slide through the first coil 271, thereby adjusting the length of the tightening wire 25 between the first occluding disk 21 and second occluding disk 23, and thus adjusting the distance between the two occluding disks. The first occluding disk 21 includes a first sleeve 214 and a first support frame 215 disposed within the central region thereof. Preferably, the first sleeve 214 is disposed at the geometric center of the first occluding disk 21. The first support frame 215 includes a plurality of support rings. The plurality of support rings are connected to the first sleeve 214 and surround the first sleeve 214 so as to form the first support frame 215. The first coil 217 is wound on the first sleeve 214. It will be appreciated that in other embodiments, the first sleeve 214 can be disposed at an eccentric position on the first occluding disk 21.

Preferably, the first coil 271 is disposed at the geometric center of the first occluding disk 21, and the tightening wire 25 is tensioned after passing through the threading hole 270 of the first coil 271. The first coil 271 and the tightening wire 25 are intersected at the geometric center of the first occluding disk 21, so that the first occluding disk 21 can be uniformly pulled, and would not be easily tilted when adjusting the length of the tightening wire 25 after the first occluding disk 21 is positioned in place.

Preferably, the first sleeve 214 can be a steel sleeve with two open ends. Alternatively, the first sleeve 214 can be a combination of multiple steel sleeves. The first sleeve 214 has two opposite openings and a cavity 2140 between the openings. In one embodiment, the first coil 271 is a single coil, which passes through the two openings and the cavity 2140 and is hanged on the first sleeve 214. In this embodiment, the cavity 2140 of the first sleeve 214 is a through hole extending along the thickness direction of the first occluding disk 21 (the direction perpendicular to the disk surface of the first occluding disk 21). The first coil 271 passes through the openings of the first sleeve 214 and the cavity 2140 and is connected to the peripheral wall of the first sleeve 214. The first coil 271 is wound on the first sleeve 214 to form the threading hole 270 through which the tightening wire 25 movably passes. When the tightening wire 25 is pulled away from the first support frame 215, the force bearing point of the first sleeve 214 is located on the geometric center line of the first support frame 215. In this embodiment, the ends of the plurality of support rings are connected to the outer periphery of the first sleeve 214, and are fixedly connected to the first sleeve 214 by welding or gluing. The first sleeve 214 is made of stainless steel, nickel-titanium alloy, or other biocompatible materials.

Specifically, the first coil 271 includes a threading coil 2712 and a positioning coil 2714 connected to each other. The threading coil 2712 has an annular shape and is provided with the threading hole 270, and the positioning coil 2714 is wound on the first sleeve 214. The threading coil 2712 and the positioning coil 2714 can be formed by the same suture or two sutures. In this embodiment, the first coil 271 is formed by knotting a suture at the knotting point 2715 to form the threading hole 270, and the two ends of the suture are wound around the outer surface of the first sleeve 214 and fixedly connected by knotting at the knotting point 2716 to form the positioning coil 2714. The positioning coil 2714 includes floating segments 2717 disposed on the first sleeve 214 and two positioning segments 2718 contacting the outer peripheral surface of the first sleeve 214. The positioning coil 2714 includes at least two opposite floating segments 2717, which are respectively located at two openings of the first sleeve 214. The floating segment 2717 extends in the radial direction of the first sleeve 214 and passes through the geometric center of the first sleeve 214. The connection between the threading coil 2712 and the positioning coil 2714 is located on at least one floating segment 2717 of the positioning coil 2714, preferably at the midpoint of one floating segment 2717. When the threading coil 2712 is tightened, the connection between the threading coil 2712 and the positioning coil 2714 and the threading coil 2712 are both located at the geometric center of the first sleeve 214. In an alternative embodiment, the connection between the threading coil 2712 and the positioning coil 2714 and the threading coil 2712 are not necessarily to be located at the geometric center of the first sleeve 214.

In other embodiments, the positioning coil 2714 is a coil formed by one suture that is wound around the outer surface of the first sleeve 214 and knotted fixedly, and the threading coil 2712 is a coil formed by another suture that is knotted and connected to the positioning coil 2714.

As shown in FIGS. 1 to 3, the first occluding disk 21 and the second occluding disk 23 can have disk surfaces in a shape of a circle, a polygon, an ellipse, a triangle or other irregular shapes. The radial size of the first occluding disk 21 and the radial size of the second occluding disk 23 can be the same or different. For example, the radial size of the first occluding disk 21 can be smaller than the radial size of the second occluding disk 22. In this embodiment, both the first occluding disk 21 and the second occluding disk 23 are substantially in the shape of a hexagonal disk, and the radial size of the first occluding disk 21 is equal to the radial size of the second occluding disk 23.

The plurality of support rings of the first support frame 215 includes a first support ring 2151. The first support ring 2151 includes a plurality of strands. The positioning coil 2714 passes through a gap between the plurality of strands of the first support ring 2151, so that the positioning coil 2714 can be securely positioned on the first sleeve 214. Preferably, the other end of the positioning coil 2714 further passes through a gap between the strands of another support ring on the opposite side, so that the positioning coil 2714 can be positioned on both sides by the strands of the respective support rings, thereby making the positioning of the positioning coil more stable.

In this embodiment, the first occluding disk 21 further includes a first flow-blocking film 218 disposed on the first support frame 215. The first flow-blocking film 218 can be fixedly disposed on the inner surface and/or the out surface of the first support frame 215 by sewing, gluing or heat bonding. In the case where the first support frame 215 is in the form of a cage, the first flow-blocking film 218 can be fixedly disposed in the inner cavity of the first support frame 215, and the first flow-blocking film 218 covers at least a portion of the inner surface or a portion of the outer surface of the first support frame 215. In this embodiment, the first flow-blocking film 218 covers the surface of the first support frame 215 facing away from the second occluding disk 23, that is, the first flow-blocking film 218 covers the outer surface of the first occluding disk 21. The first sleeve 214 is disposed on the inner side of the first occluding disk 21, and the first flow-blocking film 218 covers the opening of the first sleeve 214 facing the outer side of the first occluding disk 21 to seal the opening of the cavity 2140 of the first sleeve 214 facing the outer side of the first occluding disk 21. In this embodiment, the positioning coil 2714 passes through the gap between the first flow-blocking film 218 and the first sleeve 214, without passing through the first flow-blocking film 218, maintaining the wholeness of the first flow-blocking film 218, and reducing the generation of residual shunt and breakage of the first flow-blocking film 218 after implantation of the occluder 20.

Optionally, the first sleeve 214 includes two layers of steel sleeves, the ends of the support rings are clamped in the gap between the two steel sleeves, in the cavity between the inner and outer steel sleeves.

In one embodiment, the positioning coil 2714 is glued to the first flow-blocking film 218 to prevent displacement of the positioning coil 2714. In one embodiment, the first flow-blocking film 218 is disposed on the inner side of the first occluding disk 21, the first sleeve 214 is disposed on the inner side or outer side of the first occluding disk 21, and the positioning coil 2714 passes through the first flow-blocking film 218, with a plurality of eyelets formed in the first flow-blocking film 218 for the positioning coil 2714 passing through. It can be understood that in other embodiments, the positioning coil 2714 and the flow-blocking film 218 can be connected through other connecting methods. Even in an alternative embodiment, the first flow-blocking film 218 can be removed.

As shown in FIG. 1, the structure of the second occluding disk 23 is similar to that of the first occluding disk 21. The second occluding disk 23 also has a central region 231 and an edge region 233 around the central region 231. The second occluding disk 23 includes a second sleeve 234 disposed at the central region thereof and a second support frame 235 connected around the second sleeve 234. In this embodiment, the second sleeve 234 is fixedly disposed at the geometric center of the second occluding disk 23, and a plurality of support rings of the second support frame 235 surround the second sleeve 234. It will be appreciated that in other embodiments, the second sleeve 234 can be disposed eccentrically on the second occluding disk 23.

Figure 4:
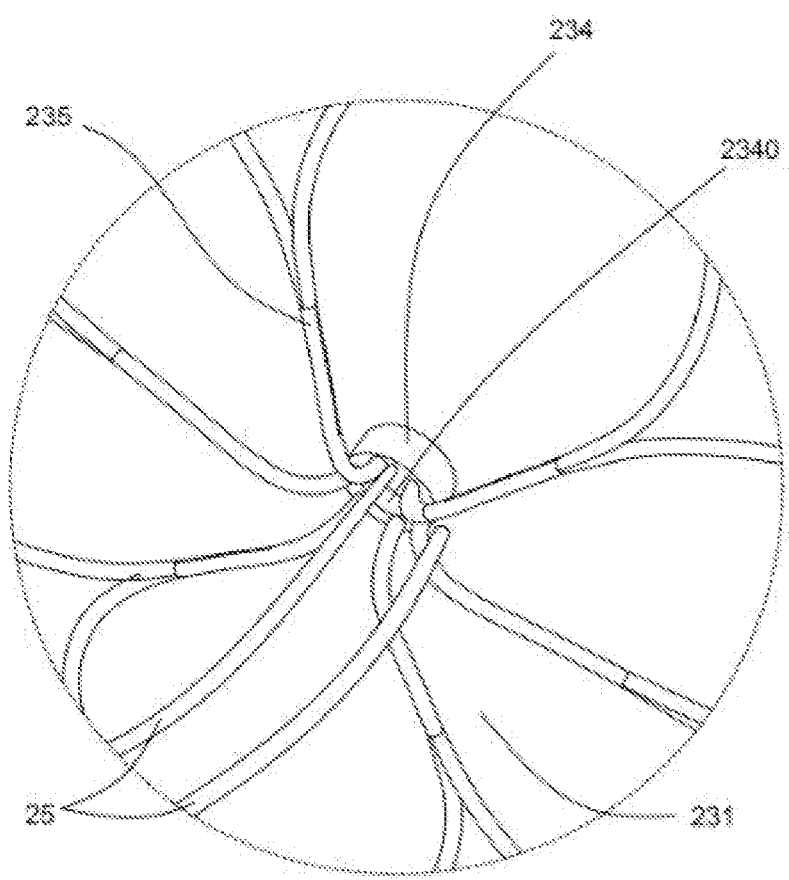
FIG. 4 is an enlarged view of part IV of FIG. 1.

As shown in FIG. 4, the structure of the second sleeve 234 is similar to that of the first sleeve 214. The second sleeve 234 can be a steel sleeve with two open ends, or a combination of multiple steel sleeves. Specifically, the second sleeve 234 is cylindrical and has a cavity 2340. Two ends of the tightening wire 25 pass through the second occluding disk 23 from the inner side to the outer side. Specifically, two ends of the tightening wire 25 pass through different positions of the second occluding disk 23, respectively. Preferably, one end of the tightening wire 25 passes through the cavity 2340 of the second sleeve 234, and the other end of the tightening wire 25 passes through the eyelet formed by the second support frame 235 around the second sleeve 234. In an alternative embodiment, two ends of the tightening wire 25 pass through different eyelets formed by the second support frame 235, respectively. In an alternative embodiment, the second sleeve 234 has two cavities extending along its axis, and two ends of the tightening wire 25 pass through different cavities of the second sleeve 234.

The ends of the plurality of support rings are fixedly disposed on the outer peripheral surface or the inner peripheral surface of the second sleeve 234. In this embodiment, the second sleeve 234 includes two layers of steel sleeves, and the ends of the support rings are clamped in the gap between the two steel sleeves. The cavity in the inner steel sleeve is used for the tightening wire passing therethrough. The second sleeve 234 is made of stainless steel, nickel-titanium alloy or other biocompatible materials. Preferably, regarding the second occluding disk 23, the second sleeve 234 is disposed on the outer side of the second occluding disk 23, i.e., the outer side of the second support frame 235. The second flow-blocking film 238 is disposed on the inner side of the second occluding disk 23, which facilitates tissue endothelialization.

In other embodiments, the ends of the support rings can be fixedly connected to the outer or inner peripheral surface of the second sleeve 234 by welding or gluing.

The second occluding disk 23 further includes a second flow-blocking film 238 disposed on the second support frame 235. The second flow-blocking film 238 can be fixedly disposed on the inner surface and/or the outer surface of the second support frame 235. In the case where the second support frame 235 is in the form of a cage, the second flow-blocking film 238 can be fixedly disposed in the inner cavity of the second support frame 235, and the second flow-blocking film 238 covers at least a radial area of the second support frame 235. In this embodiment, the second flow-blocking film 238 covers the surface of the second support frame 235 facing the first occluding disk 21, that is, the second flow-blocking film 238 covers the inner side surface of the second support frame 235. One end of the tightening wire 25 passes through the cavity 2340 of the second sleeve 234, and the other end of the tightening wire 25 passes through the eyelet formed by the second support frame 235 and the area of the second flow-blocking film 238 corresponding to the eyelet.

The first flow-blocking film 218 and the second flow-blocking film 238 can use a non-biodegradable polymer film with good biocompatibility, such as ePTFE or PET materials. Alternatively, the first flow-blocking film 218 and the second flow-blocking film 238 can use an absorbable polymer film, such as polylactic acid, polycaprolactone, polylactic acid-polycaprolactone copolymers, etc. The first flow-blocking film 218 and the second flow-blocking film 238 can be fixed to the inner surface or the outer surface of the respective occluding disks by sewing or gluing, for occluding blood flow.

The first support frame 215 and the second support frame 235 each can be a braided mesh structure or a cut frame structure, so that the first occluding disk 21 and the second occluding disk 23 can closely contact the surfaces of the atrial septum. The first support frame 215 and the second support frame 235 can be any one of a single-layer braided mesh structure, a single-layer frame structure, a double-layered braided mesh structure or a double-layered frame structure, respectively. In the present application, the first support frame 215 and the second support frame 235 are each a single-layer braided mesh structure, and the plurality of the support rings are arranged around the sleeve by at least one round. In this embodiment, as the first sleeve 214 is disposed at the geometric center of the first occluding disk 21 and the second sleeve 234 is disposed at the geometric center of the second occluding disk 23, the support rings of the first occluding disk 21 are arranged circumferentially around the geometric center of the first sleeve 214, and the support rings of the second occluding disk 23 are arranged circumferentially around the geometric center of the second sleeve 234. In a preferred embodiment, the support rings of the first occluding disk 21 and the second occluding disk 23 are evenly spaced.

As shown in FIG. 2, in this embodiment, the first support frame 215 includes six support rings which are arranged circumferentially around the geometric center of the first occluding disk 21. Two adjacent support rings are cross-connected at a connection point 2155. Specifically, the first support frame 215 further includes a second support ring 2152, a third support ring 2153, a fourth support ring, a fifth support ring, and a sixth support ring arranged in a clockwise direction from the first support ring 2151. Each support ring is formed by bending a support rod. Two ends of each support ring located within the central region 211 are fixedly connected to the first sleeve 214. The portion of each support ring located within the edge region 213 is located at the radial edge of the first occluding disk 21. Taking the first support ring 2151 as an example, the first support ring 2151 is cross-connected with the second support ring 2152 and the sixth support ring, and the ends of the first support ring 2151 within the central region 211 are connected with the first sleeve 214 and connected with the end of the third support ring 2153 within the central region and the end of the fifth support ring within the central region, respectively. That is, the first support ring 2151, the third support ring 2153 and the fifth support ring 2153 all have end connecting portions 2156, and adjacent support rings are connected in one piece at the respective end connecting portion 2156. For example, the first support ring 2151 and the third support ring 2153 are connected in one piece at the end connecting portion 2156, the third support ring 2153 and the fifth support ring are connected in one piece at the end connecting portion 2156, and the first support ring 2151 and the fifth support ring are connected in one piece at the end connecting portion 2156.

Figure 5:
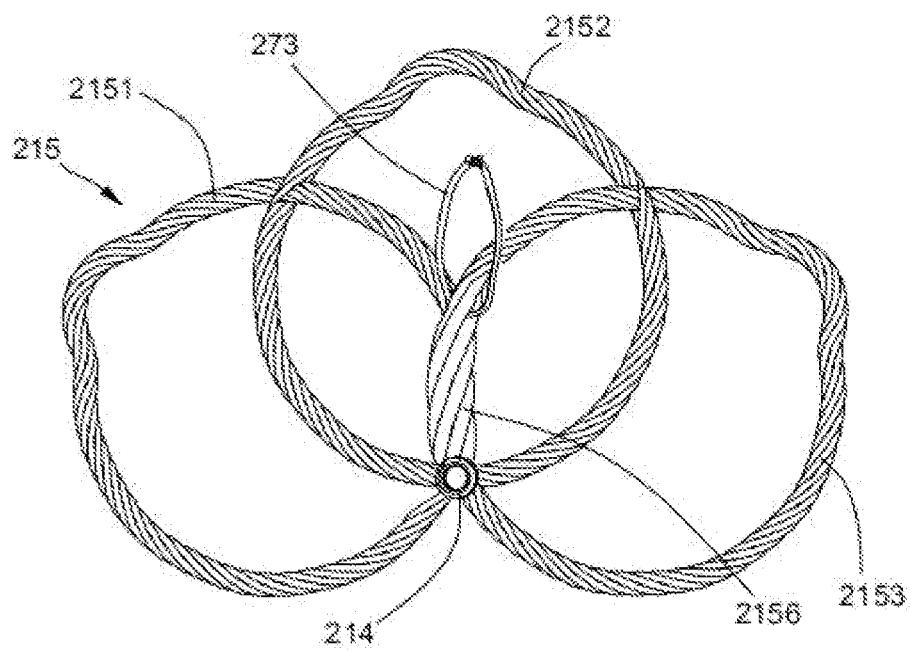
FIG. 5 is a schematic structural view of part of the first support frame and one of the second coils shown in FIG. 2.

As shown in FIG. 2 and FIG. 5, the "cross-connection" between the first support ring 2151 and the second support ring 2152 refers to that at least one of two adjacent support rings includes a plurality of strands which are intertwined with each other or arranged parallel to each other, and the other support ring is inserted in the gap between the strands of the at least one support ring, such that two adjacent support rings are positioned relative to each other. For example, the first support ring 2151 includes a plurality of strands which are intertwined with each other or arranged parallel to each other, and the cross-connection between the second support ring 2152 and the first support ring 2151 is the gap between the strands of the first support ring 2151 where the second support ring 2152 is inserted into. The second support ring 2152 also includes a plurality of strands which are intertwined with each other or arranged parallel to each other, and the cross-connection of the second support ring 2152 and the third support ring 2153 is the gap between the strands of the second support ring 2152 where the third support ring 2153 is inserted into.

The intersections of the first support ring 2151 with the third support ring 2153 and the fifth support ring are at the end connecting portions 2156, and the adjacent support rings are connected in one piece at the respective end connecting portion 2156. The end connecting portions 2156 are located within the central region 211, and the strands of two support rings are braided together at the end connecting portion 2156. For example, the first support ring 2151 and the third support ring 2153 are braided together at the end connecting portion 2156 within the central region 211, and the inter-braided region of the two support rings extend from the first sleeve 214 to the position where the two support rings are separated from each other. In an alternative embodiment, the strands of adjacent support rings at the end connecting portion 2156 are arranged parallel to each other, either secured in one piece by suture winding and knotting, or glued in one piece, or welded in one piece.

The connection points where the support rings of the first occluding disk 21 are cross-connected with each other are further away from the geometric center of the first occluding disk 21 than the connection points where the support rings of the first occluding disk 21 are braided together.

In an alternative embodiment, the connection points where the support rings of the first occluding disk 21 are cross-connected with each other are closer to the geometric center of the first occluding disk 21 than the connection points where the support rings of the first occluding disk 21 are braided together.

In an alternative embodiment, the support rings of the first occluding disk 21 are cross-connected with each other at all the connection points, or the support rings of the first occluding disk 21 are braided to each other at all the connection points.

In an alternative embodiment, the support rings of the first occluding disk 21 are cross-connected with each other at at least part of the connection points, or the support rings of the first occluding disk 21 are braided to each other at at least part of the connection points.

In the present embodiment, each support ring is formed by a plurality strands which are intertwined with each other or arranged parallel to each other, that is, the first support ring 2151 to the sixth support ring are each formed by a plurality strands. In an alternative embodiment, some of the support rings of the first occluding disk 21 each include a plurality of strands, and the other support rings of the first occluding disk 21 each include one strand.

The structure of the second support frame 235 is the same as that of the first support frame 215. Therefore, the structure of the second support frame 235 would not be repeated herein.

The support rings of the first support frame 215 and the second support frame 235 can each be made of various biocompatible materials, i.e., each support ring can be made of various biocompatible materials. Various biocompatible materials include common materials used in the manufacture of releasable medical devices, such as memory alloy materials, preferably nickel-titanium alloy. Alternatively, the first support frame 215 and the second support frame 235 can be made of biodegradable materials, i.e., each support ring can be made of biodegradable materials. The biodegradable materials include, for example, polylactic acid (PLA), polycaprolactone (PCL), polyglycolide (PGA) or polyp-dioxocyclohexanone (PDO), etc. Alternatively, the first support frame 215 and the second support frame 235 can be made of high molecular polymer materials.

As shown in FIG. 2, the connecting member 27 further includes at least one second coil 273 disposed on the side of the first occluding disk 21 facing the second occluding disk 23 around the first coil 271. The at least one second coil 273 has an annular shape and a threading hole 270. The tightening wire 25 passes through the threading holes 270 of the first coil 271 and the second coil 273. In this embodiment, the first occluding disk 21 is provided with a first coil 271 on the side thereof facing the second occluding disk 23 at the center and a plurality of second coils 273 surrounding the first coil 271. The plurality of second coils 273 are evenly spaced around the first coil 271 by at least one round, so as to improve the uniformity of the force exerted on the first occluding disk 21 during the tension and release of the tightening wire 25. In other an alternative embodiment, the second coils 273 are not necessarily to being evenly spaced.

Specifically, the first coil 271 is a central coil located at the geometric center of the first occluding disk 21. The central coil refers to the coil of the first coil 271 and the second coils 273 that is closest to the geometric center of the first occluding disk 21. The number of the plurality of second coils 273 is three. The three second coils 273 are arranged around the geometric center of the first sleeve 214 in an annular array, each of the second coils 273 is fixedly connected to the first support frame 215, and the tightening wire 25 passes through the first coil 271 and each of the second coils 273.

In an alternative embodiment, one of the second coils 273 is the central coil.

The second coil 273 is connected to the first support frame 215. Specifically, the second coil 273 can be connected to the first support frame 215 by knotting. Alternatively, the second coil 273 can be clamped between the strands at the intersection of two adjacent support rings of the first support frame 215, or can be glued to the first support frame 215.

Preferably, the second coil 273 is disposed at the connection of two adjacent support rings, such as the connection point 2155 or the end connecting portion 2156 of the support rings. Specifically, in this embodiment, as shown in FIG. 2, the intersection of the end of the first support ring 2151 and the end of the third support ring 2153, the intersection of the end of the first support ring 2151 and the end of the fifth support ring, and the intersection of the end of the third support ring 2153 and the end of the fifth support ring are each provided with a second coil 273, so that the three second coils 273 are evenly spaced around the first sleeve 214.

The second coil 273 is inserted in the gap in the intersection of the two support rings. As shown in FIG. 5, the second coil 273 is disposed at the intersection of the end of the first support ring 2151 and the end of the third support ring 2153. Specifically, the second coil 273 penetrates the end connecting portion 2156 of the first support ring 2151 and the third support ring 2153. At the end connecting portion 2156, a plurality of strands of the first support ring 2151 and the third support ring 2153 are braided together. The second coil 273 passes through the gap between the strands of the end connecting portion 2156 so as to position the second coil 273 at the first support frame 215. As shown in FIG. 5, in the present embodiment, the second coil 273 is connected to the end connecting portion 2156 of the two support rings at a portion of the end connecting portion 2156 away from the first sleeve 214. In an alternative embodiment, the second coil 273 is connected to the end connecting portion 2156 of the two support rings at a portion of the end connecting portion 2156 close to the first sleeve 214 or at a middle portion of the end connecting portion 2156. It will be appreciated that in an alternative embodiment, the second coil 273 can be disposed at the connection point 2155 where adjacent support rings are cross-connected, such as the connection point 2155 of the first support ring 2151 and the second support ring 2152 described above.

Figure 6:
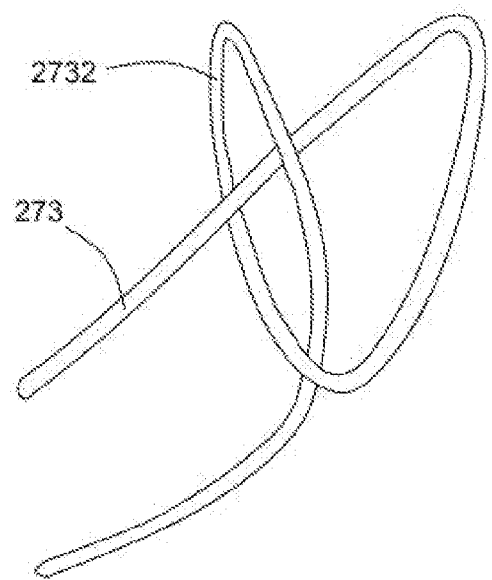
FIG. 6 is a schematic structural view showing the knotting manner of each second coil shown in FIG. 2.

As shown in FIG. 6, the first coil 271 and the second coils 273 are each formed by a suture which is knotted several times in succession in the tying method as shown in FIG. 6, so that the knots of the first coil 271 and the second coils 273 are secure and thus the first coil 271 and the second coils 273 each can be stably maintained in a loop configuration, through which the tightening wire 25 can easily pass. The knot tying method shown in FIG. 6 refers to that first looping the suture for forming the first coil 271 or the second coil 273 to form a connecting loop 2732, and then passing one end of the suture through the connecting loop 2732 to form a fixed knot.

Figure 7:
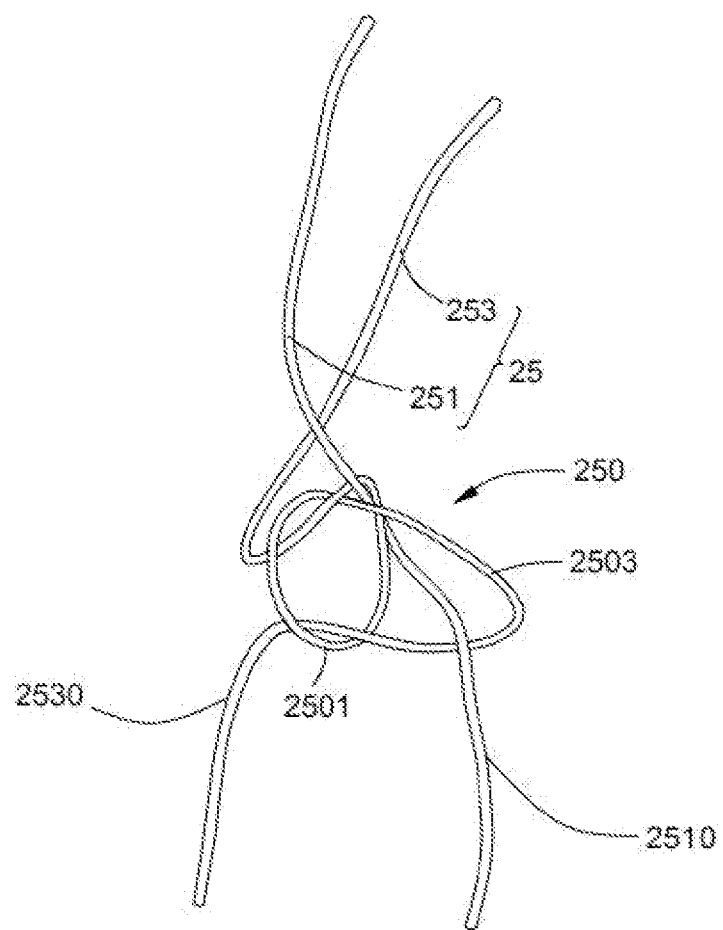
FIG. 7 is an enlarged view of the adjusting knot shown in FIG. 1.

As shown in FIG. 1 and FIG. 7, two ends of the tightening wire 25 are respectively configured as an adjusting section 251 and a locking section 253. The adjusting section 251 or the locking section 253 includes a centering section 254 connected between the first coil 271 and the second occluding disk 23. After passing through the second occluding disk 23, the adjusting section 251 and the locking section 253 form an adjusting knot 250 on the side facing away from the first occluding disk 21 (the outer side of the second occluding disk 23). The end of the adjusting section 251 passes through the adjusting knot 250, and the adjusting section 251 can be locked by locking the adjusting knot 250, so as to fix the space between the first occluding disk 21 and the second occluding disk 23 through the tightening wire 25. The centering section 254 is connected between the first occluding disk 21 and the second occluding disk 23, preferably between the inner side of the first occluding disk 21 and the inner side of the second occluding disk 23. The end of the centering section 254 away from the second occluding disk 23 passes through the threading hole 270 of the first coil 271 and the threading hole 270 of the second coil 273. When the tightening wire 25 is tensioned, the first coil 271 is tightened by the centering section 254 so that the first occluding disk 21 can be forced at the center, which facilitates the positioning control of the first occluding disk 21.

In an alternative embodiment, one of the second coils 273 is a central coil.

In an alternative embodiment, the adjusting section 251 and the locking section 253 each include a centering section 254, and two centering sections 254 extend out of the same central coil.

In an alternative embodiment, both ends of the tightening wire 25 do not pass out from the central coil.

Specifically, as shown in FIG. 7, the locking section 253 includes a free end 2530, and the adjusting section 251 includes a free end 2510. The locking section 253, the adjusting section 251 and the adjusting knot 250 are all disposed on the side of the second occluding disk 23 facing away from the first occluding disk 21. The length of the centering section 254 can be adjusted by the adjusting section 251. The free end 2530 of the locking section 253 and the free end 2510 of the adjusting section 251 are connected to the delivery device 50. The free end 2510 can be pulled proximally by controlling the delivery device 50, so that the tightening wire 25 can slide along the axial direction of the second occluding disk 23 (for example, through the cavity 2340 and the eyelets of the second support frame in this embodiment) and through the threading holes 270 of the first coil 271 and the second coil 273, thereby shortening the length of the tightening wire between the first and second occluding disks 21, 23 and thus adjusting the waist length of the occluder 20. The free end 2530 can be pulled proximally by controlling the delivery device 50, so that the adjusting knot 250 can be locked so as to lock the adjusting section 251 by the adjusting knot 250, thereby fixing the distance between the first occluding disk 21 and the second occluding disk 23 and thus fixing the distance between the first occluding disk 21 and the second occluding disk 23, which is beneficial to maintain the relative position and contact between the primary, secondary diaphragms and the two occluding disks during and after the procedure, reducing the difficulty of withdrawing the delivery device 50, facilitating the endothelialization of the two diaphragms on the occluder 20 to form a permanent atrial septum.

One end of the adjusting knot 250 is connected to a portion of the locking section 253 adjacent to the second occluding disk 23, and the other end of the adjusting knot 250 is connected to the free end 2530 away from the second occluding disk 23. When the adjusting knot 250 is not tightened, the free end 2510 can drive the adjusting section 251 connected thereto to slide through the adjusting knot 250, so as to adjust the length of the centering section 254 between the first occluding disk 21 and the second occluding disk 23. The free end 2530 of the locking section 253 is used to tighten the adjusting knot 250 so that the adjusting knot 250 can tighten a portion of the adjusting section 251 located therein, thereby fixing the length between the first occluding disk 21 and the second occluding disk 23.

As shown in FIG. 7, the adjusting knot 250 includes a base loop 2501 and a locking loop 2503 connected to each other, and the base loop 2501 and the locking loop 2503 are formed by winding and knotting the locking section 253. Specifically, one end of the base loop 2501 and one end of the locking loop 2503 are connected in one piece, and the other end of the base loop 2501 away from the locking loop 2503 (or the end of the base loop 2501 that is not connected with the locking loop 2503) extends to the second occluding disk 23. The end of the locking loop 2503 away from the base loop 2501 (or the end of the locking loop 2503 that is not connected with the base loop 2501) is the free end 2530. The free end 2510 of the adjusting section 251 passes through the base loop 2501 and the locking loop 2503. When the base loop 2501 and the locking loop 2503 are not tightened, the free end 2510 can drive the adjusting section 251 to slide through the adjusting knot 250, thereby adjusting the length of the centering section 254 between the first occluding disk 21 and the second occluding disk 23. When the free end 2530 of the locking section 253 is pulled, the locking loop 2503 and the base loop 2501 are gradually tightened in turn, so that a portion of the adjusting section 251 can be tightened in the locking loop 2503.

As shown in FIG. 1, in use, the first occluding disk 21 is delivered to the left atrium by the delivery device 50 and deployed there, and the second occluding disk 23 is delivered to the right atrium by the delivery device 50 and deployed there. The centering section 254 connected between the first occluding disk 21 and the second occluding disk 23 is flexible and adjustable in length. The centering section 254 passed through the oval foramen between the primary and secondary diaphragms. The free end 2510 of the adjusting section 251 can be pulled proximally to tension the centering section 254 which is located at the geometric center of the first occluding disk 21, so that the centering section 254 is gradually shortened, that is, the distance between the first occluding disk 21 and the second occluding disk 23 is gradually reduced. Therefore, the primary diaphragm and the secondary diaphragm are closer to each other and clamped by the first occluding disk 21 and the second occluding disk 23. The first occluding disk 21 covers the primary and secondary diaphragms around the oval foramen, and the second occluding disk 23 covers the primary and secondary diaphragms around the oval foramen. That is, the openings on the two sides of the oval foramen in the left and right atria are covered by the first occluding disk 21 and the second occluding disk 23, respectively. Since the first and second occluding disks 21 and 23 each include a support frame and a flow-blocking film disposed on the support frame, the flow-blocking films on two sides of the oval foramen can prevent blood from flowing into the oval foramen, thereby preventing the blood from flowing from the left atrium into the right atrium, so as to achieve an instantaneous occlusion. After the occluder 20 is implanted, the primary and secondary diaphragms creep to the portions of the first and second occluding disks 21, 23 contacting the primary and secondary diaphragms, thereby closing the oval foramen after the endothelialization is completed and thus forming a complete atrial septum. In an alternative embodiment, the density of the support frames of the two occluding disks is sufficiently great so that the flow-blocking film can be removed, without affecting the endothelialization of the two diaphragms on the occluding disks, and avoiding a shunt in the oval foramen channel or with a small shunt in the oval foramen channel.

Figure 8:
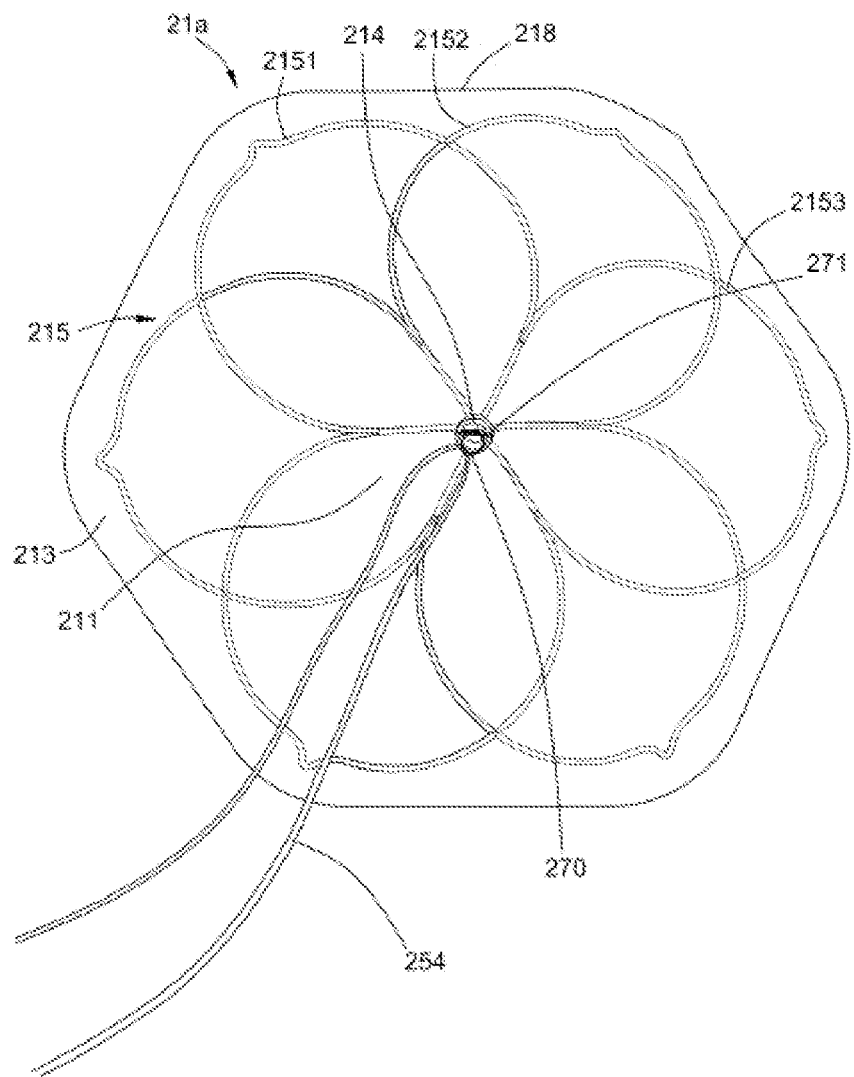
FIG. 8 is a schematic structural view of another embodiment of the first occluding disk shown in FIG. 2.

As shown in FIG. 8, the structure of the first occluding disk 21a according to another embodiment of the present application is similar to the structure of the first occluding disk 21 according to one of the above embodiments, and the difference therebetween is that: all the second coils 273 are removed from the first occluding disk 21, that is, the connecting member of the first occluding disk 21a includes only the first coil 271, and the tightening wire 25 passes through the threading hole 270 of the first coil 271. When the tightening wire 25 is pulled proximally, the tightening wire 25 can slide through the first coil 271, thereby adjusting the spacing between the two occluding disks.

Figure 9:
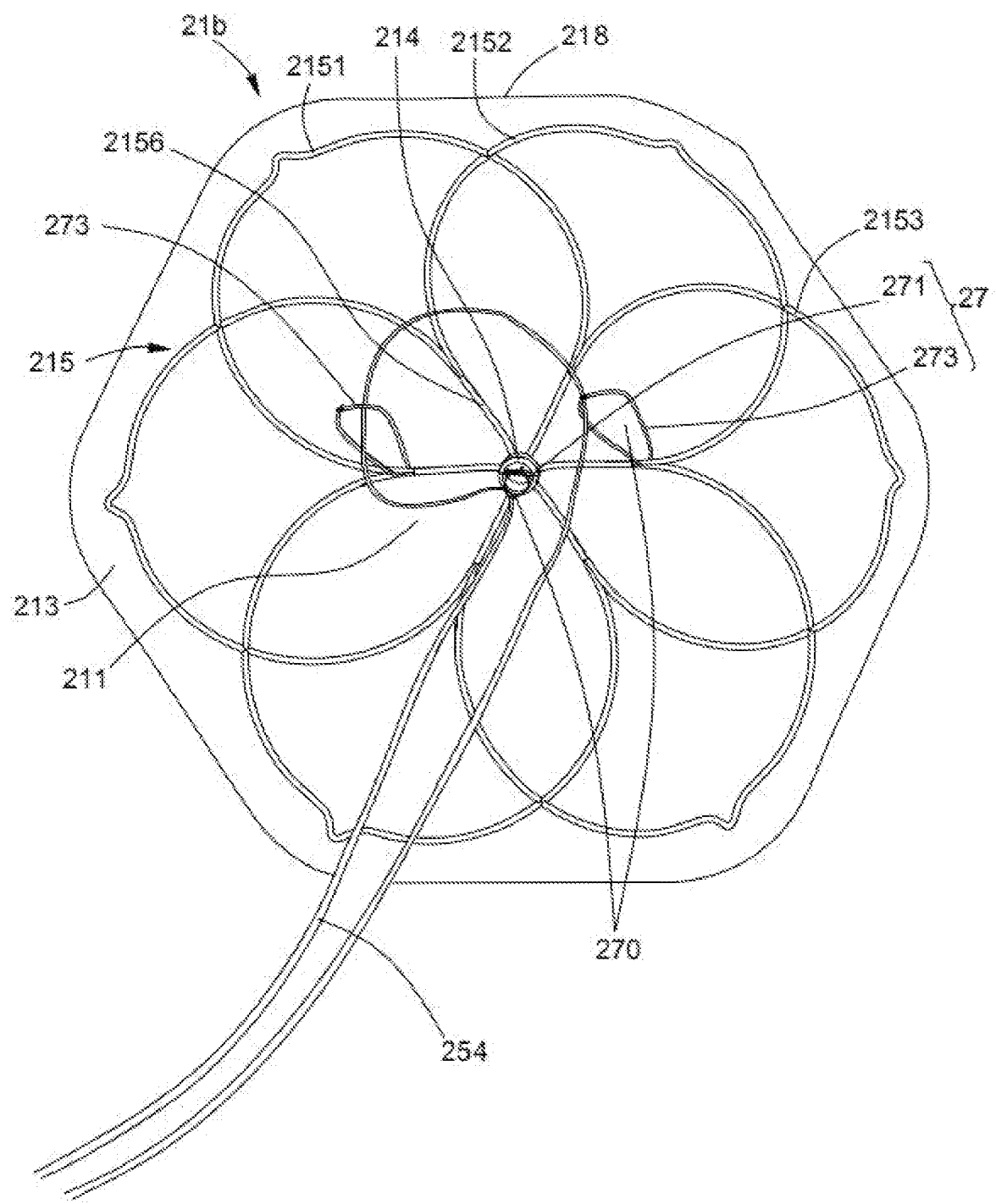
FIG. 9 is a schematic structural view of a further embodiment of the first occluding disk shown in FIG. 2.

As shown in FIG. 9, the structure of the first occluding disk 21b according to a further embodiment of the present application is similar to the structure of the first occluding disk 21 according to one of the above embodiments, and the difference therebetween is that: the connecting member of the first occluding disk 21b includes one first coil 271 and two second coils 273, wherein the first coil 271 is disposed at the geometric center of the first occluding disk 21*b*, and the two second coils 273 are disposed on the first occluding disk 21*b* and symmetrically arranged about the geometric center of the first occluding disk 21*b*. In this embodiment, one second coil 273 is connected to the intersection of the end of the first support ring 2151 and the end of the fifth support ring, and the other second coil 273 is connected to the end connecting portion 2156 of the second support ring 2152 and the fourth support ring. Each second coil 273 is inserted into the gap between the strands of the respective support rings, so that the second coil 273 is fixedly connected to the first occluding disk 21*b*. The tightening wire 25 passes through the threading hole 270 of the first coil 271 and the threading holes 270 of the respective second coils 273.

Figure 10:
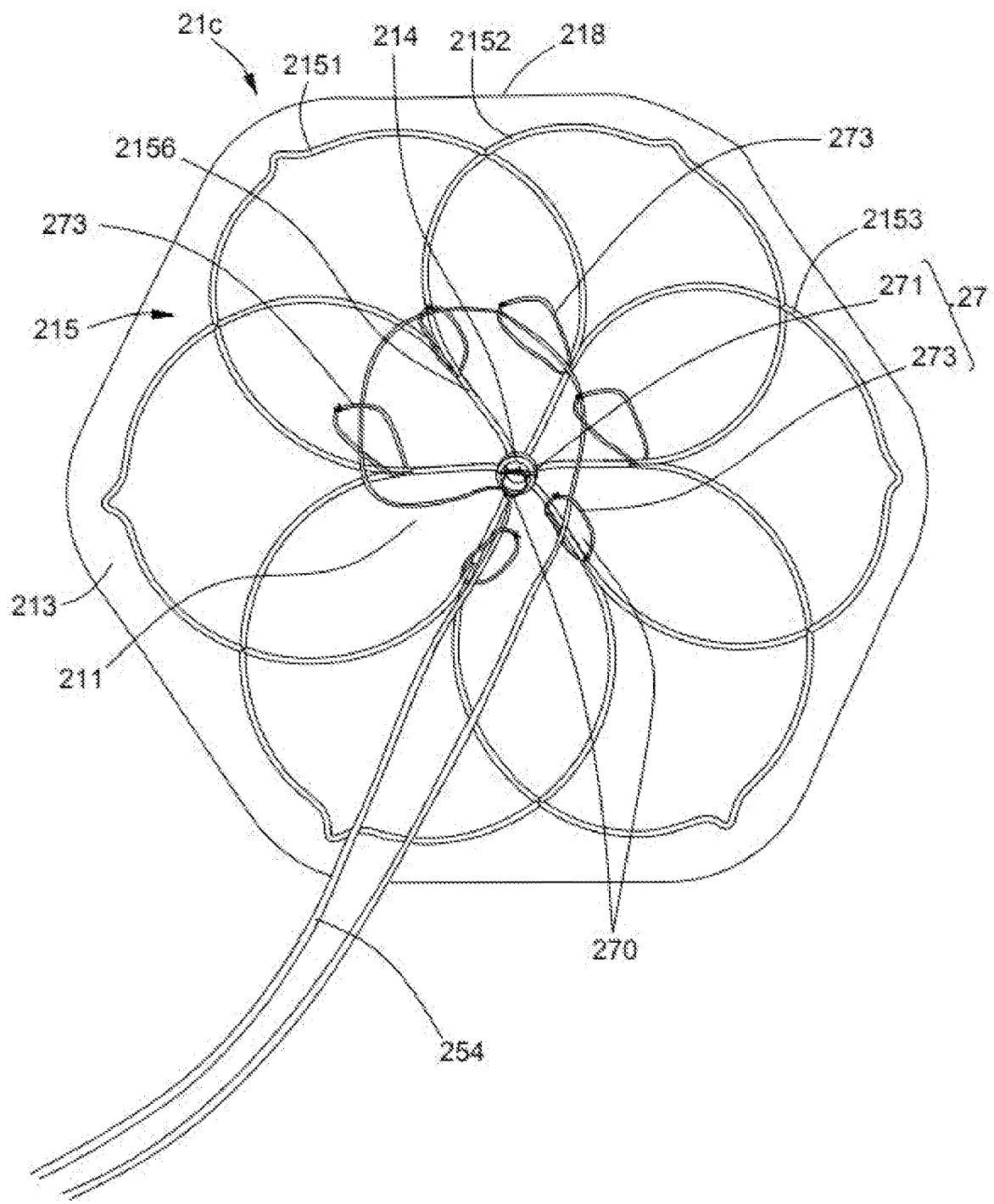
FIG. 10 is a schematic structural view of a still further embodiment of the first occluding disk shown in FIG. 2.
Figure 11:
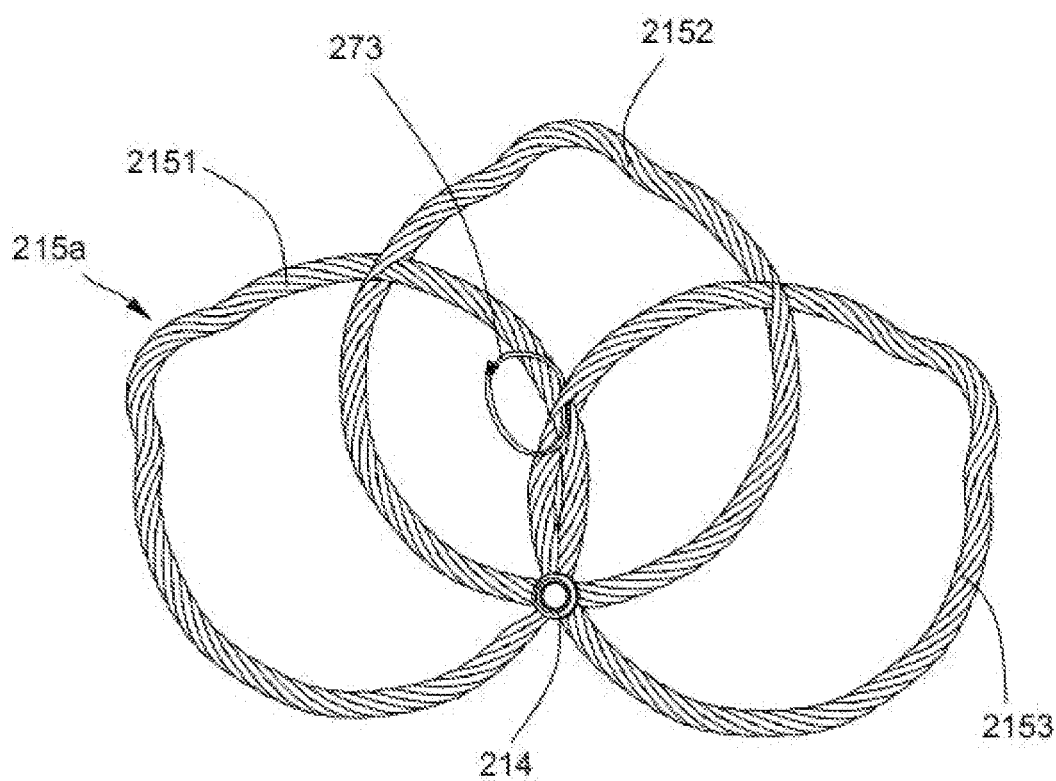
FIG. 11 is a schematic structural view of another embodiment of the first support frame and one of the second coils shown in FIG. 5.

As shown in FIG. 10, the structure of the first occluding disk 21*c* according to a still further embodiment of the present application is similar to the structure of the first occluding disk 21 according to one of the above embodiments, and the difference therebetween is that: the connecting member of the first occluding disk 21*c* includes one first coil 271 and six second coils 273, wherein the first coil 271 is disposed at the geometric center of the first occluding disk 21*c*, and the six second coils 273 are arranged around the geometric center of the first occluding disk 21*c* in an annular array by one round. In this embodiment, the end connecting portion 2156 of each adjacent two support rings 2151 is connected with a second coil 273. Specifically, the end connecting portion 2156 of the first support ring 2151 and the third support ring 2153, the end connecting portion 2156 of the first support ring 2151 and the fifth support ring, the end connecting portion 2156 of the second support ring 2152 and the fourth support ring, the end connecting portion 2156 of the second support ring 2152 and the sixth support ring, the end connecting portion 2156 of the third support ring 2153 and the fifth support ring, and the end connecting portion 2156 of the fourth support ring and the sixth support ring are respectively provided with a second coil 273. Each second coil 273 is inserted into the gap between the strands of the respective support rings, so that each second coil 273 is fixedly connected to the first occluding disk 21*c*. The tightening wire 25 passes through the threading hole 270 of the first coil 271 and the threading holes 270 of the respective second coils 273. As shown in FIG. 11, the structure of the first support frame 215*a* according to the present embodiment is similar to the structure of the first support frame 215 shown in FIG. 5 described above, and the difference therebetween is that: adjacent support rings penetrate each other at the connections within both the central region and the edge region. Specifically, the first support ring 2151 and the third support ring 2153 are located at opposite sides of the second support ring 2152. The ends of the first support ring 2151 and the third support ring 2153 are connected with and penetrate each other, and the first sleeve 214 is spaced from the connection of the end of the first support ring 2151 and the end of the third support ring 2153, with an eyelet defined therebetween. In this embodiment, the end of the first support ring 2151 is inserted into the gap between the strands of the end of the third support ring 2153. In other embodiment, the end of the third support ring 2153 can be inserted into the gap between the strands of the end of the first support ring 2151. Alternatively, a part of the strands of the end of the first support ring 2151 can be inserted into the gap between the strands of the end of the third support ring 2153. Preferably, the support rings of the first support frame 215*a* penetrate each other at all the connections.

Figure 12:
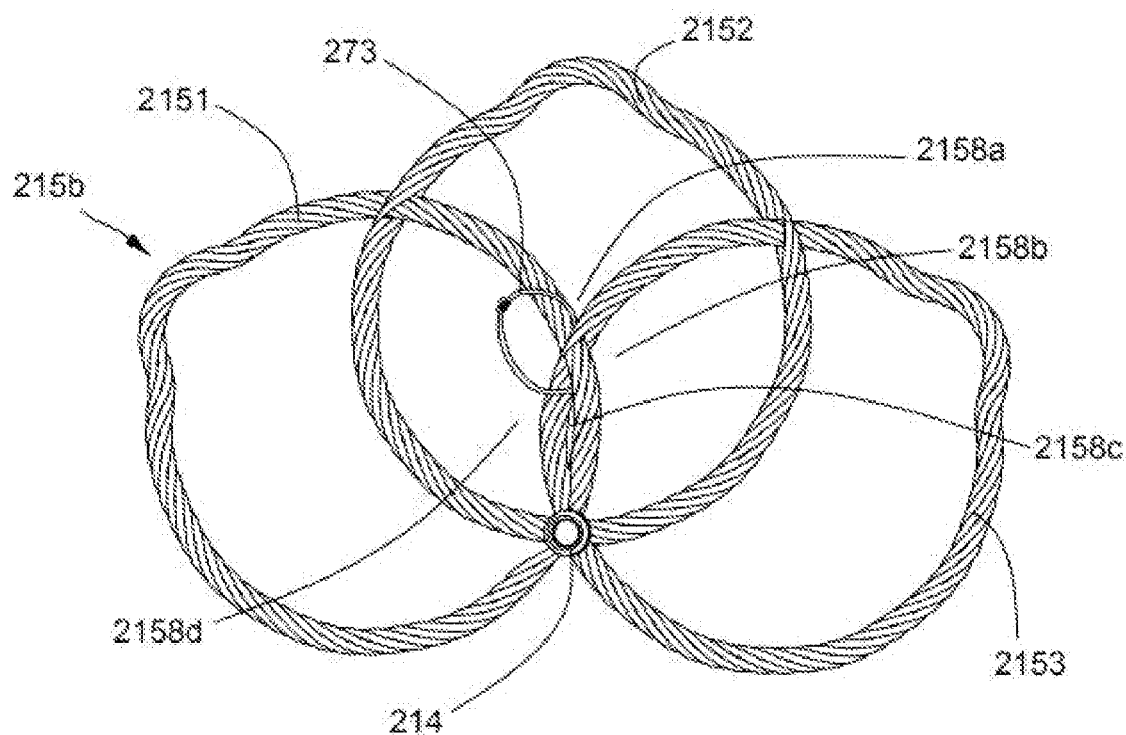
FIG. 12 is a schematic structural view of a further embodiment of the first support frame and one of the second coils shown in FIG. 5.

As shown in FIG. 12, the structure of the first support frame 215*b* in this embodiment is similar to the structure of the first support frame 215*a* shown in FIG. 11 described above, and the difference therebetween is that: the second coil 273 passes through the eyelet 2158 formed at the connection where the first support ring 2151 and the third support ring 2153 penetrate each other. Specifically, four eyelets 2158*a*, 2158*b*, 2158*c*, 2158*d* are defined which are distributed in a clockwise direction at the connection where the first support ring 2151 and the third support ring 2153 penetrate each other, wherein the eyelet 2158*a* is opposite to the eyelet 2158*c*, and the eyelet 2158*b* is opposite to the eyelet 2158*d*. The eyelet 2158*c* is surrounded by first support ring 2151 and the third support ring 2153 and is located within the central region. The eyelet 2158*a* is further away from first sleeve 214 than the eyelet 2158*c*. The eyelet 2158*b* and the eyelet 2158*d* are located at two sides of the eyelet 2158*a* and the eyelet 2158*c*, respectively. The second coil 273 is inserted in the eyelet 2158*a* and the eyelet 2158*c*, and extends across the connection of the first support ring 2151 and the third support ring 2153, thereby preventing the second support ring 273 from being displaced on the first support frame.

Figure 13:
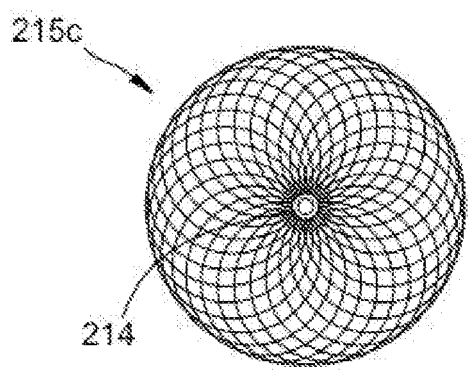
FIG. 13 is a schematic structural view of a structure of the support frame of the occluder according to one embodiment of the present application.
Figure 14:
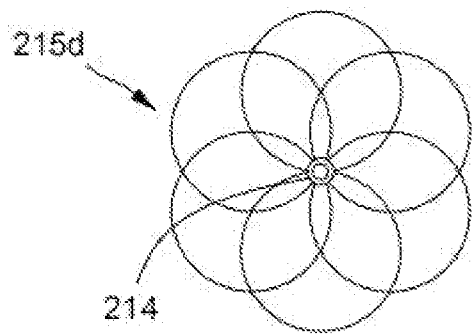
FIG. 14 is a schematic structural view of another structure of the support frame of the occluder according to one embodiment of the present application.
Figure 15:
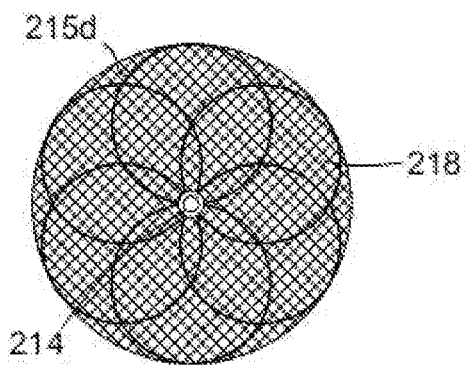
FIG. 15 is a schematic structural view of the support frame of FIG. 14 with a flow-blocking film provided thereon.

In other embodiments, the first support frame 215 and the second support frame 235 each are generally braided from 4 to 50 support rings, with eyelets formed between adjacent support rings. Hereinafter, the first support frame 215 will be described as an example. The following description can also be applied to the second support frame 235. The first support frame 215*c* as shown in FIG. 13 is formed by thirty circular support rings circumferentially arranged around the axis of the first sleeve 214. The first support frame 215*d* shown in FIGS. 14 and 15 is formed by six circular supporting rings arranged in an annular array around the axis of the first sleeve 214. The first support frame 215*d* shown in FIG. 15 is provided with a first flow-blocking film 218.

Figure 16:
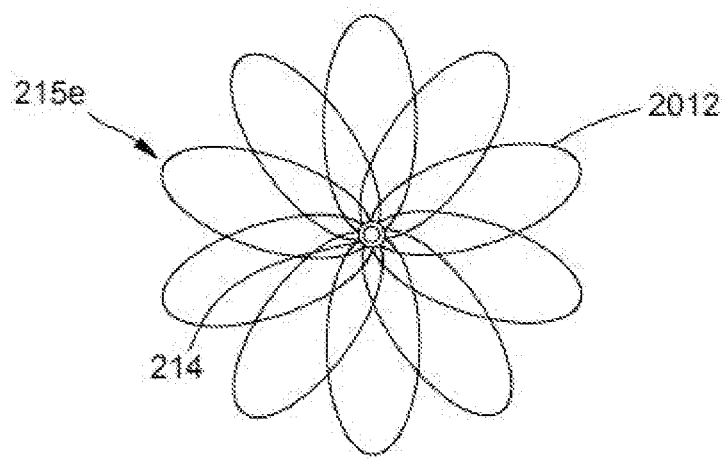
FIG. 16 is a schematic structural view of another structure of the support frame of the occluder according to one embodiment of the present application.
Figure 17:
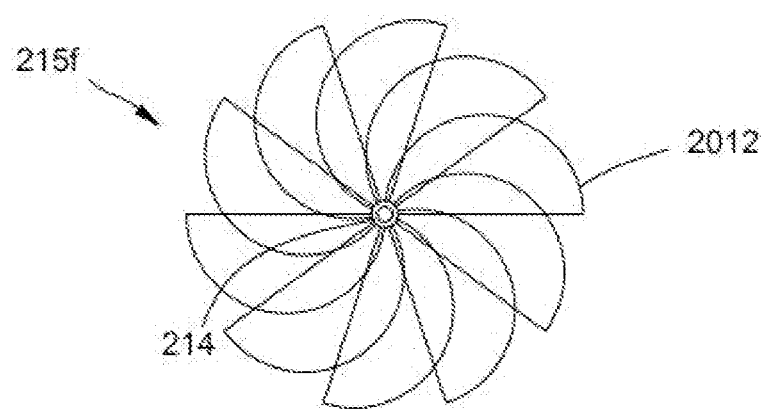
FIG. 17 is a schematic structural view of another structure of the support frame of the occluder according to one embodiment of the present application.
Figure 18:
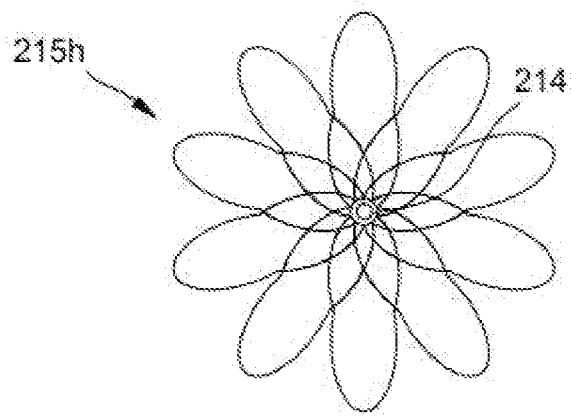
FIG. 18 is a schematic structural view of another structure of the support frame of the occluder according to one embodiment of the present application.

In other embodiment, each of the support rings can be elliptical, semi-circular, or irregularly shape, etc. As shown in FIG. 16, the first support frame 215*e* includes a plurality of oval-shaped support rings arranged in an annular array around the geometric center of the first sleeve 214, wherein one end of each support ring is connected to the first sleeve 214, and the inner surface and/or the outer surface of the first support frame 215*e* are provided with the flow-blocking film. As shown in FIG. 17, the first support frame 215*f* is formed by several semicircular support rings arranged in an annular array around the geometric center of the first support frame 215*f*, wherein one end of each support ring is connected to the first sleeve 214, and the inner surface and/or the outer surface of the first support frame 215*f* are provided with the flow-blocking film. As shown in FIG. 18, the first support frame 215*h* is formed by several irregularly shaped support rings arranged in an annular array around the geometric center of the first support frame 215*h*, wherein one end of each support ring is connected to the first sleeve 214, and the inner surface and/or the outer surface of the first support frame 215*h* are provided with the flow-blocking film.

The tightening wire 25 and the connecting member can use non-absorbable biocompatible sutures, such as metal wire, cotton thread, polyester, polypropylene and the like. Alternatively, the tightening wire 25 and the connecting member can use absorbable biocompatible sutures, such as catgut, polyglycolide, multi-filament non-biodegradable suture and the like. Alternatively, the tightening wire 25 can use forcibly wound fiber and the like.

In the present embodiment, the tightening wire 25 uses PTFE suture which is a material having good toughness and high mechanical strength. Alternatively, the tightening wire 25 can use biodegradable PGA, PGLA, PLA, collagen, nylon suture, polyester suture, and the like. The material of the connecting member 27 is a PP material which has a good tensile strength and hardness. Alternatively, the connecting member 27 can use PET, ePTFE or the material used for the above-mentioned tightening wire 25. In this embodiment, the connecting member 27 is made of a suture with two strands, so that the occluder has a good connection strength. In other embodiment, the connecting member 27 can use suture with more strands, or suture with one strand.

In procedure, the occlusion system 100 of the present application is used in cooperation with a guide wire, the delivery device 50, a dilator, and the like. The procedure is as follows:

1. Insert the guide wire into the left superior pulmonary vein, retain the guide wire and insert the delivery sheath and dilator into the middle of the left atrium, and withdraw the dilator and the guide wire.
2. Keep the delivery sheath still, insert the delivery rod of the delivery device 50 carrying the first occluding disk 21 and the second occluding disk 23 into the posterior end of the delivery sheath, push the delivery device forward, and push the anterior end of the delivery rod out of the delivery sheath.
3. Release the first occluding disk 21 relatively away from the handle 54 within the left atrium until the first occluding disk 21 is deployed within the left atrium; subsequently retract the delivery sheath with the delivery device 50; when the delivery sheath is retracted into the right atrium, release the second occluding disk 23 until the second occluding disk 23 is deployed in the right atrium; now the adjusting knot 250 is in a relaxed state, the base loop 2501, the locking loop 2503 and the adjusting knot 250 are in a relaxed state, and the loops are not tightened.
4. Fix the second occluding disk 23 at the distal end of the delivery sheath, and pull the free end 2510 of the adjusting section 251 proximally by the delivery device 50 so that the centering section 254 is straightened and shortened in length, so as to drive the first occluding disk 21 and the second occluding disk 23 to move relative to the atrial septum until the inner side of the first occluding disk 21 abuts against the side of the atrial septum around the oval foramen, and the inner side of the second occluding disk 23 abuts against the other side of the atrial septum around the oval foramen.
5. When the atrial septum around the oval foramen is firmly clamped by the first occluding disk 21 and the second occluding disk 23, pull the free end 2530 of the locking section 253 proximally by the delivery device 50 to gradually tighten the locking loop 2503 which will in turn drive the base loop 2501 to be tightened until both the locking loop 2503 and the base loop 2501 are tightened, so that the adjusting section 251 is tensioned and locked by the locking loop 2503 and the base loop 2501 and fixed between the locking loop 2503 and the base loop 2501, and the length of the tightening wire 25 between the first occluding disk 21 and the second occluding disk 23 is fixed, thereby clamping the atrial septum between the first occluding disk 21 and the second occluding disk 23.
6. After the knotting is completed, push the suture trimmer into the right atrium through the delivery sheath, cut the suture at a distance of 3-5 mm from the adjusting knot, and withdraw the delivery sheath and the suture trimmer, thereby achieving the occlusion of the oval foramen.

For convenience of description, numbers are used for the above steps of the method. However, it should be noted that the numbers are not used to limit the sequence among the steps. Without departing from the spirit of the present application, the specific technical solutions according to the above embodiments are applicable with each other.

The above embodiments are the implementations of the present application. It should be noted that several modifications and improvements can be made by those skilled in the art without departing from the principle of the embodiments of the present application. These modifications and improvements are also considered to be within the scope of the present application.

The invention claimed is:

1. An occluder for occluding a defect in a vasculature, wherein the occluder comprises:
   a first occluding disk and a second occluding disk for respectively covering different openings of the defect, wherein the first occluding disk is provided with a connecting member, and the connecting member is provided with a threading hole, and
   a tightening wire passing through the threading hole of the connecting member, two ends of the tightening wire passing through the second occluding disk and forming an adjusting knot on a side of the second occluding disk facing away from the first occluding disk, and a spacing between the first occluding disk and the second occluding disk being adjustable by the ends of the tightening wire,
   wherein the first occluding disk comprises a central region and an edge region located at an edge of the central region, the connecting member comprises a first coil disposed within the central region, the first coil is annular and defines the threading hole, and the tightening wire passes through the threading hole of the first coil;
   wherein the first occluding disk comprises a first sleeve and a first support frame, the first sleeve has a cylindrical shape, the first support frame comprises a plurality of support rings connected with each other, and ends of the plurality of support rings are received in the first sleeve on which the first coil is wound;
   wherein the first sleeve has two opposite openings and a cavity between the two openings, and the first coil passes through the two openings and the cavity and is hanged on the first sleeve; and
   wherein the first occluding disk further comprises a first flow-blocking film which covers a surface of the first support frame on a side facing away from the second occluding disk and a corresponding one of the two openings of the first sleeve facing outwardly to seal the corresponding opening of the first sleeve facing outwardly, and the first coil passes through a gap between the first flow-blocking film and an outer axial end of the first sleeve that defines the corresponding opening.

2. The occluder according to claim 1, wherein the first coil is disposed at a geometric center of the first occluding disk.

3. The occluder according to claim 1, wherein the first coil comprises a threading coil and a positioning coil connected to each other, and wherein the threading coil is annular and defines the threading hole, and the positioning coil is wound on the first sleeve.

4. The occluder according to claim 3, wherein the plurality of support rings comprise a first support ring which comprises a plurality of strands, and the positioning coil passes through a gap between the plurality of strands of the first support ring.

5. The occluder according to claim 1, wherein the connecting member further comprises at least one second coil disposed on a side of the first occluding disk facing the second occluding disk and located radially outer than the first coil, and the at least one second coil is annular and defines at least one another threading hole, and the tightening wire passes through the threading holes of the first coil and the second coil.

6. The occluder according to claim 5, wherein the two ends of the tightening wire are respectively configured as an adjusting section and a locking section, and the adjusting section and/or the locking section comprise a centering section connected between the first coil and the second occluding disk.

7. The occluder according to claim 5, wherein the at least one second coil comprises a plurality of second coils, and the plurality of second coils are arranged annularly surrounding the first coil by at least one round and evenly spaced from each other in a circumferential direction of the first occluding disk.

8. The occluder according to claim 5, wherein the second coil is connected to the first support frame.

9. The occluder according to claim 8, wherein two adjacent support rings intersect each other, and the at least one second coil is disposed at a junction of the two support rings.

10. The occluder according to claim 9, wherein the two support rings are braided together at the junction, and the second coil passes through a gap in the junction of the two support rings.

11. The occluder according to claim 10, wherein the two support rings are respectively a first support ring and a second support ring, and wherein the first support ring comprises a plurality of braided strands, the second support ring is inserted into the gap between the plurality of braided strands of the first support ring, and the second coil passes through the gap.

12. The occluder according to claim 5, wherein the first coil and each second coil are each formed by a suture which is knotted several times in succession.

13. The occluder according to claim 1, wherein the two ends of the tightening wire pass through different portions of the second occluding disk, respectively.

14. The occluder according to claim 13, wherein the second occluding disk comprises a central region and an edge region located at an edge of the central region, the second occluding disk comprises a second sleeve and a second support frame, an end of the second support frame located within the central region of the second occluding disk is received in the second sleeve, and the second sleeve has a cylindrical shape and has a cavity, and wherein one end of the tightening wire passes through the cavity of the second sleeve, and the other end of the tightening wire passes through an eyelet formed by the second support frame around the second sleeve.

15. The occluder according to claim 14, wherein the second occluding disk comprises a second flow-blocking film which covers a surface of the second support frame on a side facing the first occluding disk.

16. The occluder according to claim 1, wherein the tightening wire comprises a locking section and an adjusting section respectively located at the two ends thereof, the adjusting knot is connected to the locking section on the side of the second occluding disk facing away from the first occluding disk, and the adjusting section is slidably inserted within the adjusting knot, and wherein the adjusting knot comprises a base loop and a locking loop connected to each other, an end of the base loop away from the locking loop is connected to the locking section, an end of the locking loop away from the base loop is connected to a free end of the locking section, a free end of the adjusting section is inserted within the base loop and the locking loop, and when the free end of the locking section is pulled, the locking loop and the base loop are gradually tightened in turn until the adjusting section is tighten and locked within the locking section.

17. An occlusion system comprising the occluder according to claim 1, the system further comprising a delivery device for connecting the tightening wire and for controlling the ends of the tightening wire to adjust the spacing between the first and second occluding disks.

* * * * *